US 6,640,468 B2

(12) United States Patent
Menze

(10) Patent No.: US 6,640,468 B2
(45) Date of Patent: Nov. 4, 2003

(54) VEHICLE MOUNTED SNOWPLOW IMPACT MONITORING SYSTEM AND METHOD

(75) Inventor: Peter C. Menze, Marquette, MI (US)

(73) Assignees: M. P. Menze Research & Development Inc., Marquette, MI (US); Curtis International, Inc., Worcester, MA (US)

( * ) Notice: Subject to any disclaimer, the term of this patent is extended or adjusted under 35 U.S.C. 154(b) by 62 days.

(21) Appl. No.: 10/084,129

(22) Filed: Feb. 25, 2002

(65) Prior Publication Data

US 2002/0133981 A1 Sep. 26, 2002

Related U.S. Application Data

(60) Provisional application No. 60/271,802, filed on Feb. 27, 2001.

(51) Int. Cl.$^7$ .................................................. E01H 5/04
(52) U.S. Cl. ........................................................ 37/234
(58) Field of Search ........................ 37/236, 234, 348, 37/235, DIG. 19; 172/2, 4, 4.5, 7–11, 810, 801, 805; 414/699, 685

(56) References Cited

U.S. PATENT DOCUMENTS

| 5,265,356 A | * 11/1993 | Winter ........................ 37/234 |
| 5,829,174 A | 11/1998 | Hadler et al. |
| 5,832,637 A | 11/1998 | Aguado et al. |
| 5,901,476 A | * 5/1999 | Buonfiglio .................... 37/234 |
| 5,987,785 A | 11/1999 | Aguado et al. |
| 6,044,579 A | 4/2000 | Hadler et al. |
| 6,154,986 A | 12/2000 | Hadler et al. |

* cited by examiner

Primary Examiner—Robert E. Pezzuto
(74) Attorney, Agent, or Firm—Oppenheimer Wolff & Donnelly LLP

(57) ABSTRACT

A snowplow control system is provided that uses the distance between the vehicle frame and the ground or wheel axle as an input to a feedback loop useable to provide increased control over the pressure exerted by the plow blade. The control system allows the plow to operate in various modes of operation including a manual mode, a float mode, and a down pressure mode. The control system interfaces with the vehicle operator by way of a controller that is preferably operable from within the cabin of the vehicle.

53 Claims, 8 Drawing Sheets

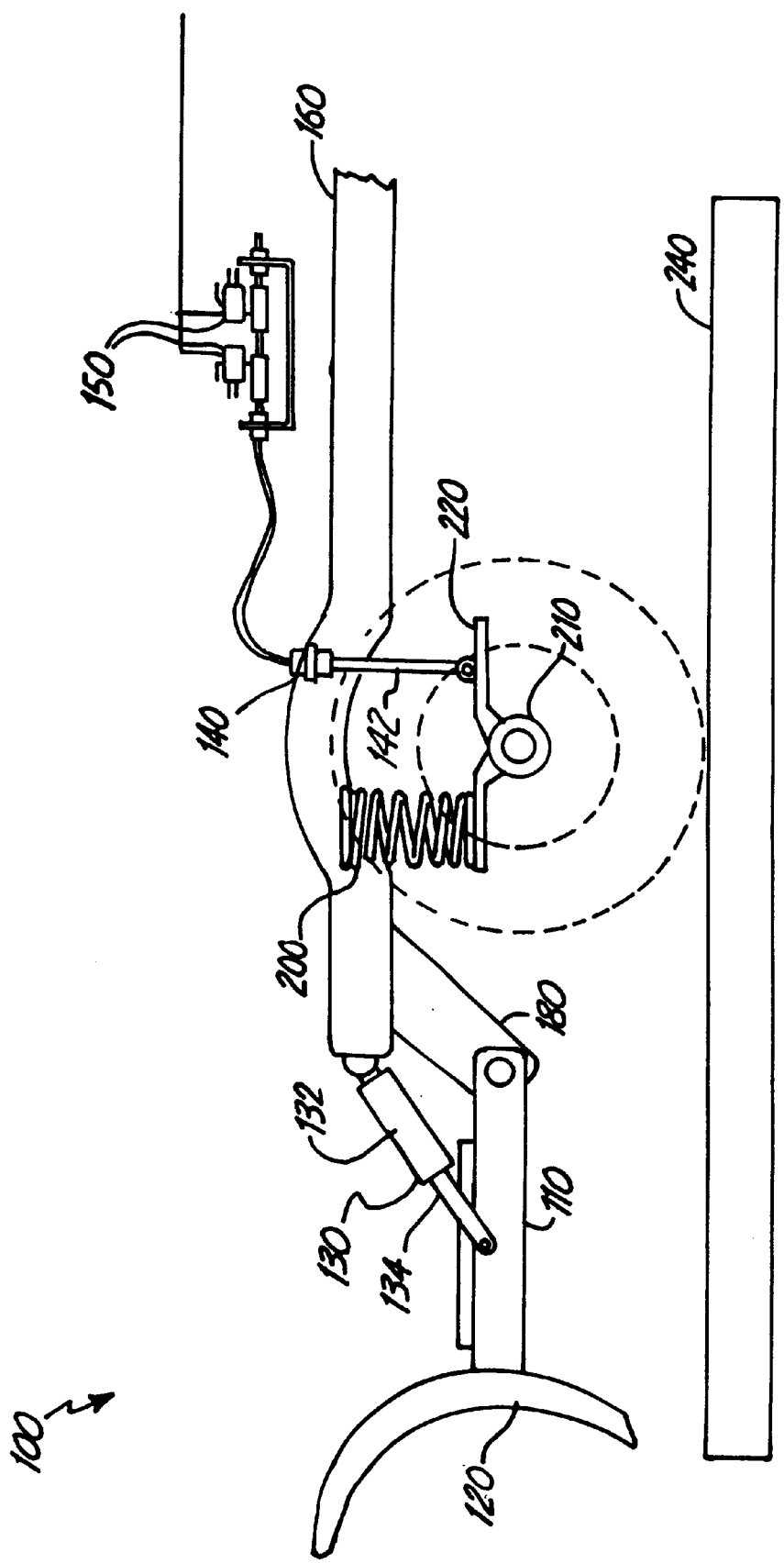

VEHICLE MOUNTED SNOWPLOW IMPACT MONITORING SYSTEM AND METHOD

RELATED APPLICATION

This application is related to provisional application serial No. 60/271,802, filed in the U.S. Patent Office on Feb. 27, 2001, and claims priority therefrom.

BACKGROUND OF THE INVENTION

Typical snowplow systems designed to be mounted on smaller vehicles, such as pickup trucks or sport utility vehicles, operate by providing a plow blade pivotally mounted on a support arm which, in turn, is pivotally mounted to the vehicle frame. A first mechanism is used to raise or lower the plow by causing the support arm to pivot around an axis proximate the vehicle. This first mechanism is usually a hydraulic piston assembly or, in simpler cases, an electric winch. While plowing, the plow is in a lowered position and can pivot around a horizontal axis defined by a hinge which connects the plow to the distal end of the support arm. A spring or similar biasing mechanism extends from an attachment point on the support arm to another attachment point on the top of the plow. The spring controls the rotation of the plow around its axis of rotation by biasing the lower, leading edge of the plow in a forward direction. In the event that the plow contacts a relatively immovable object, the plow is allowed to rotate around its hinge such that the leading edge rotates rearwardly, thereby stretching the spring. Once the object has passed under the leading edge, the spring pulls the top edge of the plow back, thereby rotating the leading edge forward to its normal operating position. This damping feature protects the vehicle frame from encountering excessive forces during a plowing operation.

Rudimentary systems rely on the weight and shape of the plow to provide the downward force necessary to keep the plow close to the ground during operation. More advanced systems have additional measures for providing downward force. Such force is desirable when using a plow to scrape hard-packed snow and ice from a road's surface. Providing such a downward force must be done in a controlled manner to prevent injury to the plow and vehicle. Existing systems utilize hydraulic pressure sensors in order to maintain a predetermined downward pressure on the blade of the plow. Unfortunately, there are many problems pertaining to the complexity of these systems.

Existing hydraulic systems must be installed on the carrier vehicle at the factory while the vehicle is being assembled. Their complexity and structural requirements preclude them from being added to existing vehicles as an after-market retrofit. Therefore, a decision must be made at the time the sport utility vehicle or pickup truck is being purchased as to whether it will ever be used as a snowplow.

In addition to this installation limitation, the complexity of existing hydraulic systems renders them costly and unreliable. They incorporate special hydraulic manifolds that typically include expensive pressure sensors to monitor the downward force exerted by the plow blade. These complicated sensors have problems with leakage and also tend to exhibit inconsistent performance at varying temperatures. Because they monitor the pressure of the hydraulic manifold, they become inaccurate when the hydraulic fluid changes viscosity due to temperature fluctuations. Furthermore, the valve body used to maintain the pressure must be designed to accommodate these sensors. This complex valve does not allow the plow operator to adjust the preset amount of downward pressure exerted by the blade. This becomes problematic when the plow is used to clear light snow from softer surfaces such as dirt roads.

Also, the existing hydraulic systems necessarily include a significant number of electrical wires extending from the sensors to the plow control system. These wires are susceptible to breaking and corrosion. As snowplows are used in cold environments and typically come into contact with corrosive salts, minimizing the number of electrical wires exposed to these harsh conditions would be beneficial.

It can be seen that there is a need for a reliable plow system which places a user-selected downward force on the plow blade.

Additionally, there is a need for a plow system which can be easily mounted on the front or rear of a sport utility vehicle or light truck as an after-market addition.

There is also a need for a plow system which is minimally susceptible to electrical failure due to wire breakage and corrosion.

There is yet a further need for a plow system which can be controlled and adjusted from the cab of the carrier vehicle.

BRIEF SUMMARY OF THE INVENTION

The various embodiments of the present invention pertain generally to a plow system which includes a control system that monitors the downward pressure exerted by the blade as a function of the spatial relationship between the vehicle frame and the ground. As the downward pressure of the blade increases, the front of the vehicle is lifted somewhat, relieving some of the weight the vehicle places on its front suspension, thereby increasing the distance between the vehicle frame and the ground or an object substantially fixed relative to the ground, such as the front axle or wheel. The relative simplicity of this system allows it to be added to the front or the rear frames of existing sport utility vehicles or light trucks. Additionally, by constantly monitoring the performance and position of the vehicle's front suspension, the system lends itself to the inclusion of limit or overload measures to ensure the suspension will not be damaged during operation of the plow.

One embodiment of the present invention includes a telescoping sensor linkage attached to the frame of the carrier vehicle with an upper bracket. The linkage is directed downwardly and abuts against a lower bracket which is fixed relative to the vehicle's front axle. The telescoping sensor linkage is constructed and arranged to sense and measure changes in the distance between the upper bracket and the lower bracket and sends this information, either mechanically or electronically, to a plurality of micro switches. The micro switches are operably attached to valve controllers which control the flow of hydraulic fluid through the hydraulic cylinders. One of these micro switches, then, can be designated as a pressure increase switch while the other can be designated as a pressure decrease switch. Alternatively, more than two micro switches may be used. For instance, it may be desirable to use four micro switches to provide redundancy in the event that one or both of the other micro switches malfunctions. It may also be desire to designate two of the micro switches for use in a relatively light plowing operation such as light snow, and designate the other two micro switches for use during heavier operation such as plowing heavy snow and ice, spreading gravel, or grading operations.

The distance between the upper and lower brackets of this embodiment is representative of a load placed on the suspended frame of the vehicle. It is understood that the device could be constructed and arranged to measure the distance between the suspended frame and the ground, however, the inclusion of a lower bracket provides a relatively clean surface against which the telescoping sensor can act. Such a mechanical sensor measuring distance to the ground by actually coming in contact therewith, would likely encounter obstacles such as snow and ice during operation, and would render such a configuration impractical.

Another embodiment of the present invention includes an electronic proximity sensor, similarly mounted to the vehicle frame, and directed toward a lower mounting bracket which provides a flat, horizontal target against which the proximity sensor may measure distance. Though it is envisioned that the proximity sensor could be directed at the ground and measure distance therefrom, the bracket provides a surface which is free from irregularities and, therefore, would provide a more accurate indication of the front-end loading the vehicle is experiencing due to the downward pressure of the plow.

The electronic proximity sensor is electrically connected to an electronic control box which accepts data from the proximity sensor and uses it to control the flow of hydraulic fluid in the cylinder used to control the vertical position of the plow blade. The electronic control box also provides data to the vehicle operator who can then adjust the downward pressure of the blade and the mode of operation thereof, from the cab of the carrier vehicle.

Another embodiment uses a variable resistor to convert the mechanical reading of changes in the elevation of the frame to an electrical representation. A mechanical linkage, such as that described above, is operably connected with a potentiometer or variable resistor so that when the frame moves up and down, the current flowing out of the variable resistor changes, thereby providing a current to a control system having fluctuations representative of the changes in elevation of the frame.

It is further envisioned that the various embodiments of the present invention provide multiple modes of operation of the plow blade. One such mode of operation is a "float" mode. While operating in the float mode, the valves porting fluid to either side of the hydraulic cylinder are left open, allowing it to move freely, so that the weight of the plow may be used to provide the necessary down pressure. As the plow blade encounters contours in the road surface, the hydraulic fluid is allowed to flow between other sides of the hydraulic cylinder, thereby allowing the plow blade to raise or lower as necessary and "float" over the surface of the road. In this mode of operation, the proximity sensor may be used as an overload protection device. If an extreme contour is encountered, the sensor would detect an abrupt change in the load on the vehicle's suspension, activate the hydraulic pump, and close the ports to the cylinder as necessary to raise or lower the plow blade.

Another such mode of operation is the "down pressure" mode. The vehicle operator selects a desired amount of pressure that he or she wants the blade to be putting on the surface being plowed. This amount of pressure will correspond to a distance between the suspended vehicle frame and elevation which is relatively fixed to the ground such as that of a wheel or an axle. That distance is then monitored and corrections are made to the elevation of the snowplow such that the set distance or load on the vehicle's suspension is maintained during operation.

Another such mode of operation is a manual operation mode. Manual mode may be desired when various levels of ice buildup exist on a relatively flat surface and it is desired to use the plow blade to scrape the ice off of the surface, regardless of load. Another application of manual mode may be when it is desired to leave a gap between the bottom of the plow and the hard ground such as may be the case when using the plow to spread a layer of gravel or other granular material. A switch is provided for this mode of operation which allows the operator to raise and lower the blade to a certain elevation and sufficiently fix the height of the blade, relative to the vehicle, during operation. A plurality of operator control configurations are envisioned and described in more detail herein.

BRIEF DESCRIPTION OF THE DRAWINGS

FIG. 3 is a schematic drawing of another alternative embodiment of a snow plow system of the present invention;

DETAILED DESCRIPTION OF THE INVENTION

Figure 1:
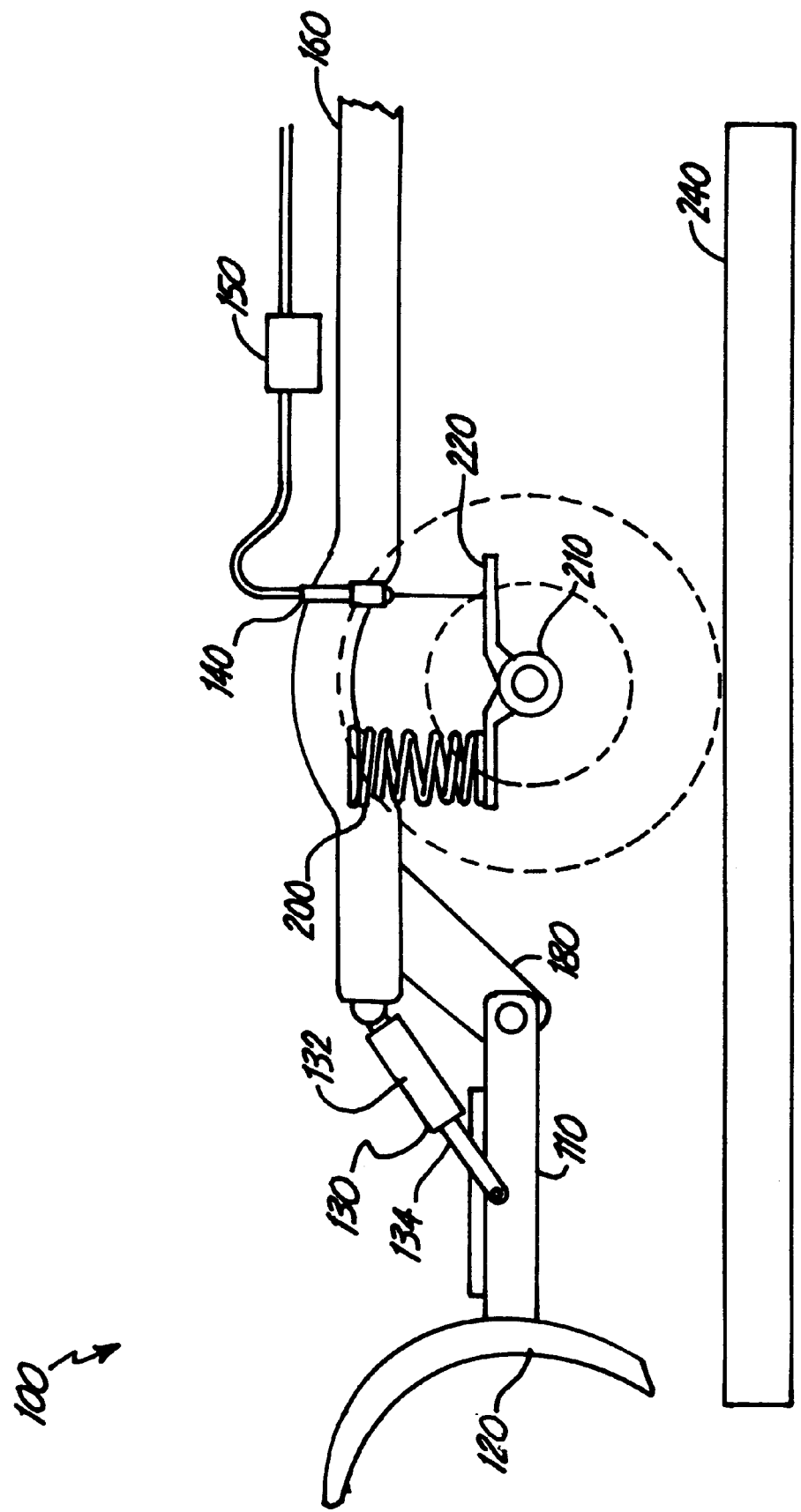
FIG. 1 is a schematic drawing of an embodiment of a snow plow system of the present invention.

Referring to FIG. 1, there is shown a snow plow system 100 which is attachable to an existing light truck such as a pickup truck or sport utility vehicle. Snow plow system 100 generally comprises a mounting bracket 180, mountable to a vehicle frame 160. The vehicle frame 160 is attached to an axle 210, preferably through a suspension mechanism such as a vehicle spring 200. The snow plow system 100 includes a support arm 110 which is attached to plow blade 120 at its forward end. Preferably, the plow blade 120 is pivotally attached to support arm 110 and can pivot forwardly and rearwardly around a horizontal axis. A spring (not shown) may be provided to pull the top portion of the plow blade 120 rearward toward support arm 110, thereby biasing the bottom edge of plow blade 120 forward.

Support arm 110 is pivotally attached at its rearward end to the mounting bracket 180, such that support arm 110 may be raised and lowered around a horizontal axis by positioner 130. Positioner 130 is attached at one end to vehicle frame 160 and at the other end to support arm 110. In the preferred embodiment, to effect the raising and lowering of support arm 110, positioner 130 includes at least one hydraulic cylinder 132. The hydraulic cylinder 132 houses a piston that may slide within the cylinder 132 and is connected to a push rod 134 which makes up the end of the cylinder 132 attached to support arm 110. An oil distribution box (not shown) houses valves used to port hydraulic oil to and from either side of the piston, thereby causing the piston to slide back and forth within the cylinder 132, raising and lowering support arm 110. Pressurized hydraulic fluid is supplied by a hydraulic oil pump (not shown).

The snow plow system 100 measures the impact mounting bracket 180 has on vehicle frame 160 during operation and particularly whether the impact increases above or drops below a predetermined set load. This measurement is taken using sensor 140 that is attached to vehicle frame 160. When the snow plow system 100 is operating, the sensor 140 measures fluctuations in the load felt by vehicle frame 160 by detecting variations in the distance between the vehicle frame 160 and a reference point. The reference point is a point fixed relative to at least one of the wheels such as bracket 220 attached to vehicle axle 210, shown in FIG. 1, or the ground 240, shown in FIG. 2. Sensor 140 interprets these fluctuations as indicative of the impact felt by vehicle frame 160 from the mounting bracket 180 and sends corresponding data, mechanical or electrical, to control system 150. The control system 150 uses the data to determine whether the load has changed from the predetermined set load, and what reaction is appropriate, as described below.

Figure 2:
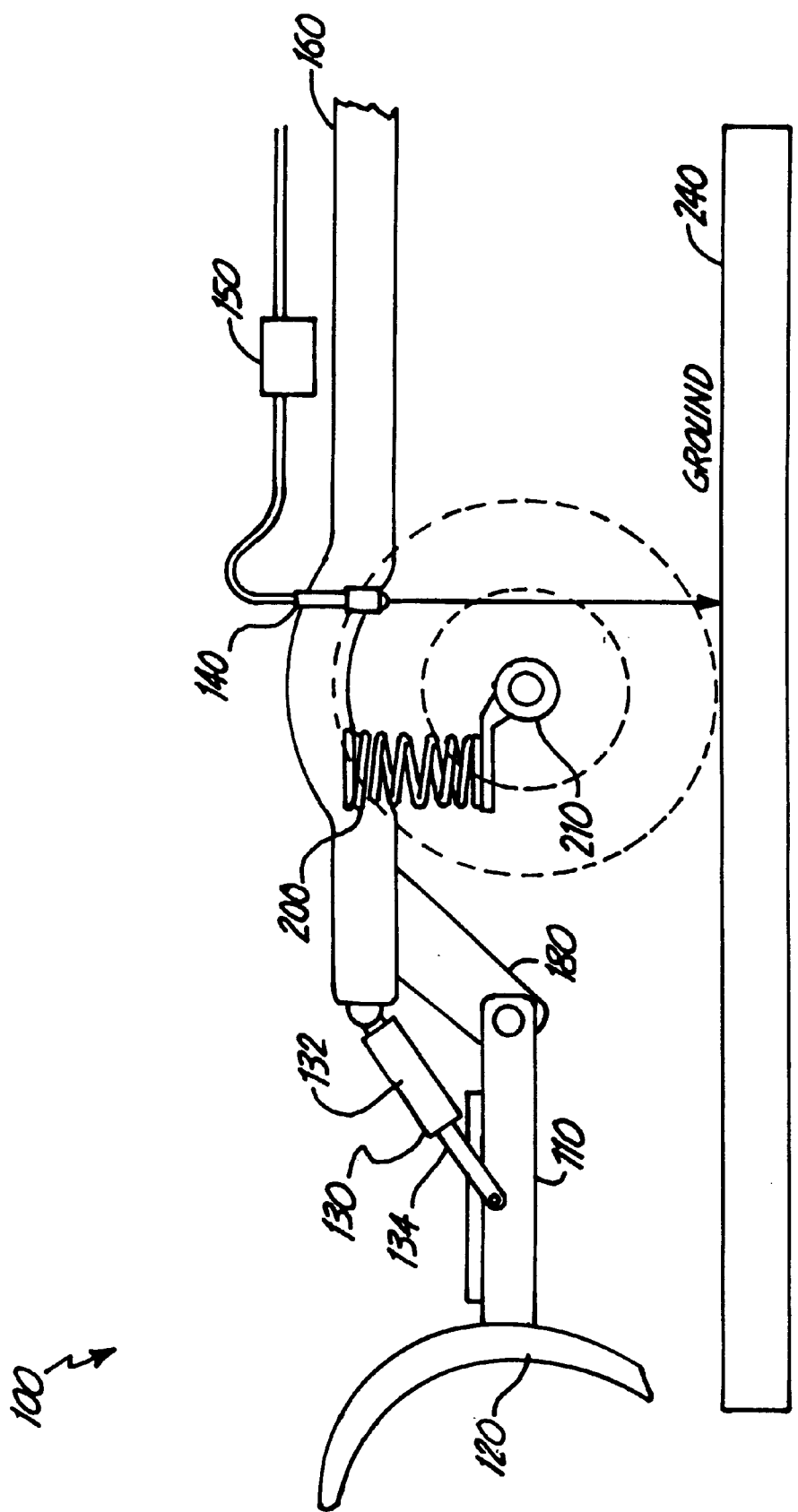
FIG. 2 is a schematic drawing of an alternative embodiment of a snow plow system of the present invention.

Sensor 140 may be a proximity sensor, such as an electronic proximity sensor shown in FIGS. 1 and 2. Examples of acceptable electronic proximity sensors include ultrasonic, laser, infrared, SONAR, and RADAR. Alternatively, the sensor 140 may be a mechanical sensor as shown in FIG. 3. In this embodiment, sensor 140 is attached to vehicle frame 160 and includes a telescoping linkage 142 that contacts a target surface that serves as a reference point, substantially fixed relative to at least one of the wheels such as a bracket 220. By monitoring the telescoping linkage 142 as it expands and contracts, the mechanical sensor 140 detects variations in the distance between vehicle frame 160 and axle 210.

Control system 150 receives load data from the sensor 140 and controls the positioner 130 used to pivot support arm 110 accordingly to maintain a target load selected by the vehicle operator. Thus, control system 150 is a closed-loop feedback system. However, the control system preferably includes a manual mode whereby control system 150 controls the positioner 130 in response to manual instruction provided from a user. Upon receipt of load change data received from sensor 140, control system 150 sends instructions to the positioner 130, and upon receipt of these instructions, the positioner 130 causes the support arm 110 pivot accordingly. For instance, in a preferred embodiment positioner 130 includes the hydraulic cylinder 132, controlled by porting oil to either side of a piston (not shown) slideably housed therein. The piston is connected to the push rod 134, shown in FIGS. 1–3, which in turn is attached to support arm 110, and therefore, by so controlling the oil distribution, control system 150 thereby directs positioner 130 to pivot support arm 110 and completes the feedback system.

In another embodiment, shown in FIGS. 3 and 4A–F, control system 150 is electromechanical and provides feedback utilizing at least one switch 300 having at least two positions. The switch 300 changes positions in response to changes in the predetermined set load as described below. Data is conveyed from sensor 140 to control system 150 by movement of a sliding shaft 260 mechanically connected to sensor 140. This movement is proportional to the fluctuations of the load felt by vehicle frame 160. Sliding shaft 260 is mechanically connected to sensor 140 and is arranged to activate and deactivate micro switches 300 as the actual load increases or decreases relative to the predetermined set load as described below.

Figure 4A:
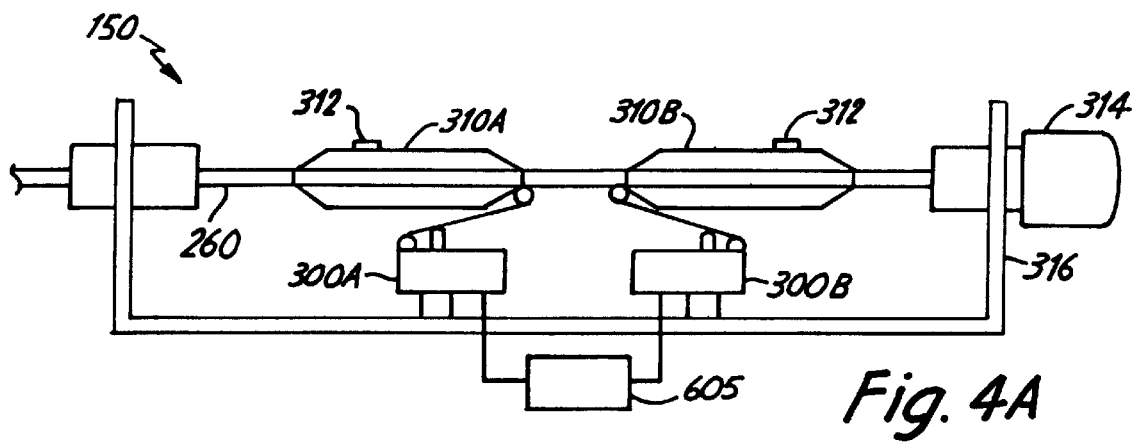
FIGS. 4A–E are diagrammatic views of a preferred embodiment of the control system of the present invention shown in various positions.
Figure 4B:
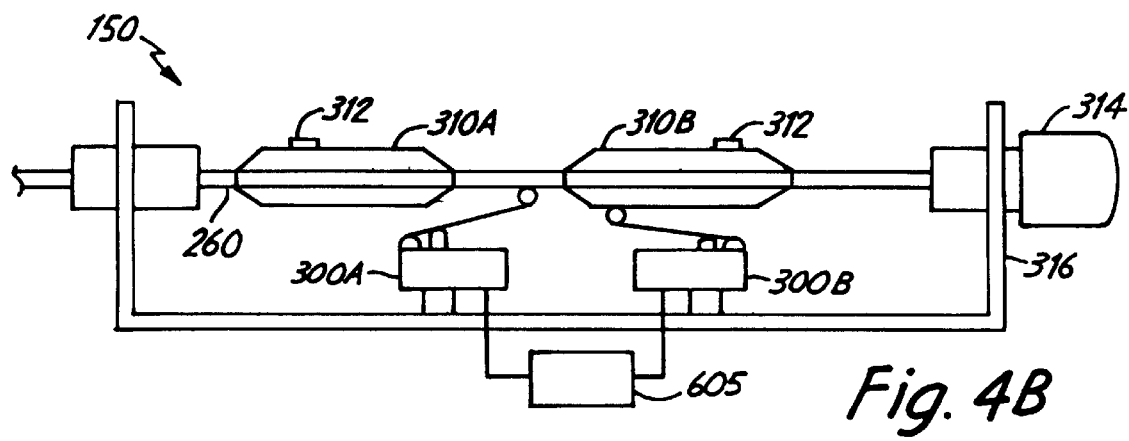
Figure 4C:
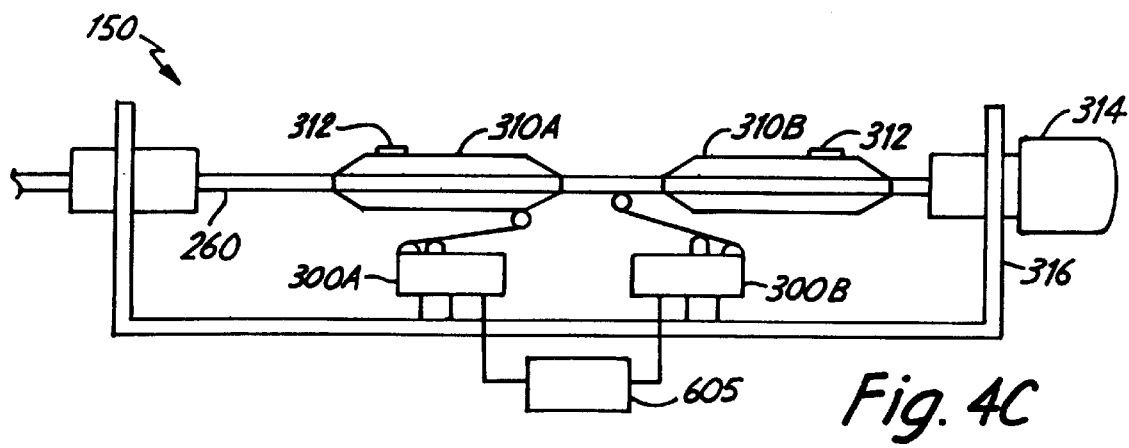

Once data is conveyed from sensor 140 to control system 150, control system 150 sends instructions to positioner 130 to pivot support arm 110. These instructions take the form of electronic signals from micro switches 300. In one embodiment, there are two micro switches 300, one designated as a pressure increase switch 300A and the other designated as a pressure decrease switch 300B, shown in FIG. 4A. These switches 300 are fixedly attached to bracket 316, which holds the control system 150 to the vehicle frame 160. Sliding shaft 260 is slideably attached to bracket 316 such that it can move relative to bracket 316 as shown in FIG. 4A. Sliding shaft 260 has a cap 314 attached to one end to restrict the sliding movement from over-extension.

Actuators 310 are fixedly attached to sliding shaft 260 by set screws 312, which allow the locations of the actuators 310 to be adjusted, if necessary. Each micro switch 300 can come into contact with an actuator 310, thereby activating the micro switch 300. When vehicle frame 160 has the correct pressure and the load has not increased nor decreased relative to the predetermined set load, sliding shaft 260 will rest in its neutral position, shown in FIG. 4A, such that neither micro switch 300 touches an actuator and both micro switches 300 are therefore deactivated. As the load increases, sliding shaft 260 responds by moving to the left into the overload position, shown in FIG. 4B, such that micro switch 300B contacts the actuator 310B and the pressure decrease switch 300B is activated. The activation of the pressure decrease switch 300B causes the oil to be ported through the hydraulic cylinder 132 such that the pressure therein is relieved, causing the actuator 310B to move to the right until the sliding shaft 260 achieves the neutral position once again. When the load decreases, sliding shaft 260 responds by moving to the right into the underload position, shown in FIG. 4C, such that the micro switch 300A contacts the actuator 310A and the pressure increase switch 300A is activated until the sliding shaft 260 moves to the left and the neutral position is again achieved.

Figure 4D:
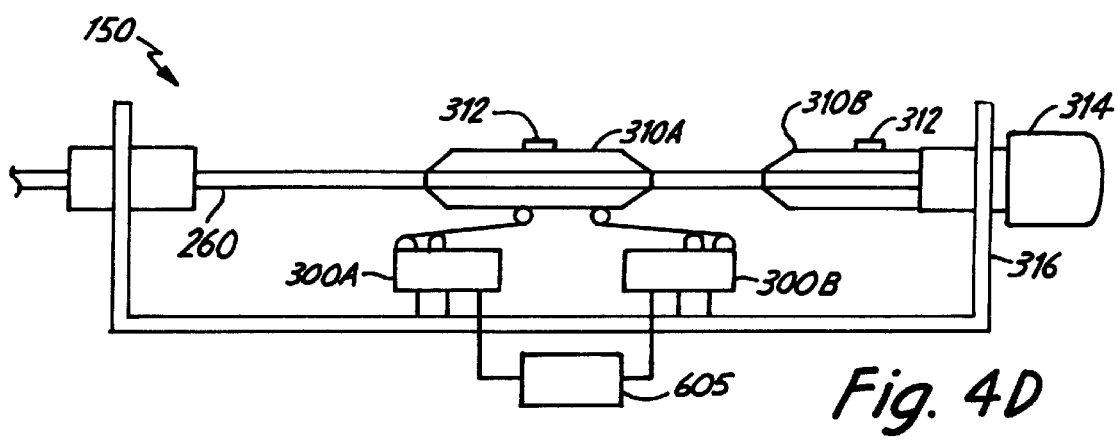
Figure 4E:
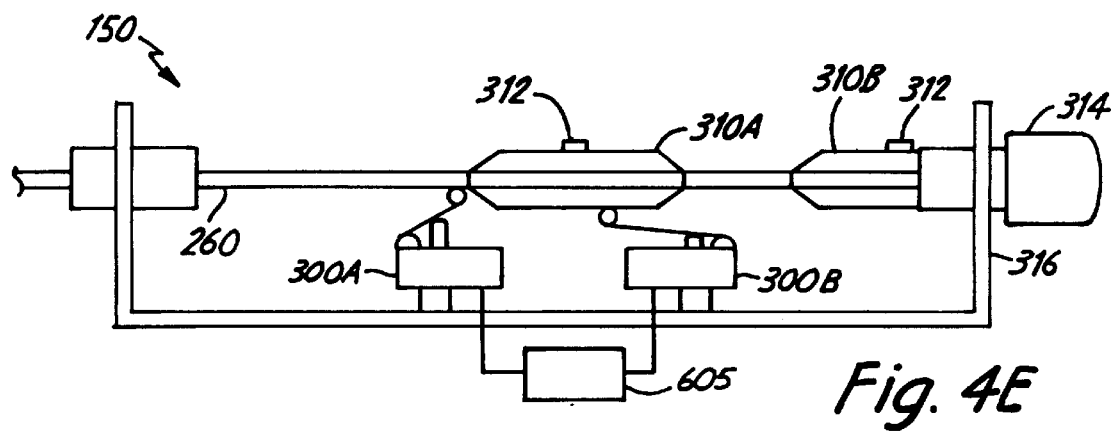

Additionally, control system 150 may implement the two micro switches 300 for deriving additional information about the pressure on vehicle frame 160, such as underloads that exceed a preset limit, shown in FIGS. 4D and 4E. FIG. 4D shows the circumstance where the load decreases past a set limit such that both micro switches 300A and 300B contact actuator 310A. When both switches 300 are activated, all oil ports are opened, thereby releasing all pressure; to prevent damaging the hydraulic system, mounting bracket 180, and/or vehicle frame 160.

FIG. 4E shows the circumstance where the load decreases past yet a further limit such that micro switch 300B contacts actuator 310A but micro switch 300A no longer contacts any actuator 310. Although the switch positions are the same as those in FIG. 4B, a microprocessor 605 is preferably operably connected to the switches 300 and is constructed and arranged for accepting input therefrom and keeping historical data pertaining to the positions of the switches 300. Thus, in the case shown in FIG. 4E, the microprocessor registers a condition whereby switch 300A is "off" and switch 300B is "on". The microprocessor also notes that this condition occurred immediately after an "on—on" condition, as was shown in FIG. 4D. The microprocessor is thus able to distinguish the condition shown in FIG. 4E from the condition shown in FIG. 4B, and act accordingly, preferably by canceling all functions and releasing all pressures, in order to prevent equipment damage.

Figure 4F:
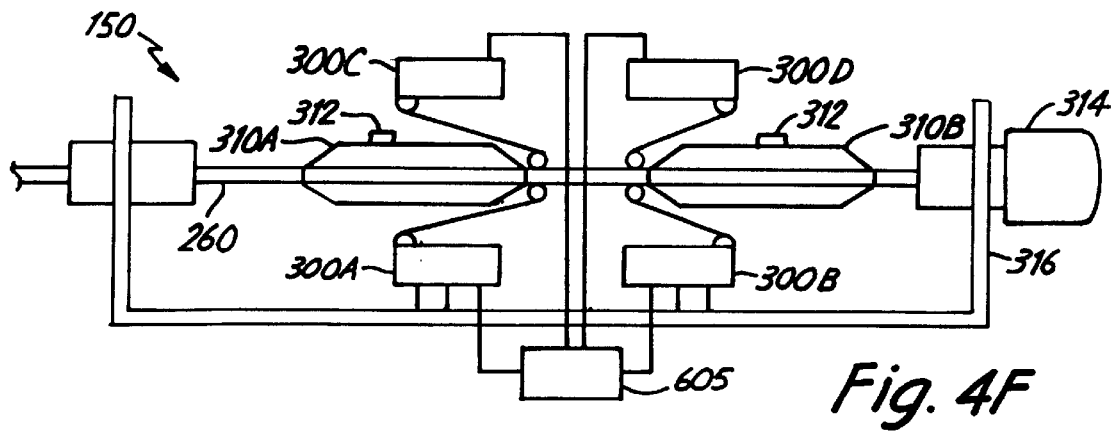
FIG. 4F is a diagrammatic view of an alternative embodiment of the control system of the present invention.

Alternatively, control system 150 may implement three or four micro switches 300, shown in FIG. 4F, thereby providing redundancy in the control system in the event that a micro switch 300 malfunctions. The redundancy is provided by designating two micro switches 300 as pressure increase switches—micro switches 300A and 300C—and designating the other two switches as pressure decrease switches—micro switches 300B and 300D. All of the switches 300 are shown diagrammatically as being operably connected to the microprocessor 605. However, additional redundancy may be achieved by providing multiple microprocessors.

Implementing four micro switches 300 shown in FIG. 4F alternatively allows the control system 150 to operate micro switches 300 in varying modes, designating two micro switches 300 for use in relatively light plowing conditions— micro switch 300A as a pressure increase switch and micro switch 300B as a pressure decrease switch—and designating the other two micro switches 300 for use in relatively heavy plowing conditions—micro switch 300C as a pressure increase switch and micro switch 300D as a pressure decrease switch. These conditional designations may be achieved, for instance, by locating switches 300C and 300D in closer proximity to each other. This way, switches 300A and 300B are acted upon first by movement of the actuators 310, signifying normal or light movement. 300C and 300D would become actuated only when more significant or heavy movement of the actuators 310 occurs. Alternatively, control system 150 may even implement only a single micro switch 300 for receiving data from sensor 140.

Figure 5:
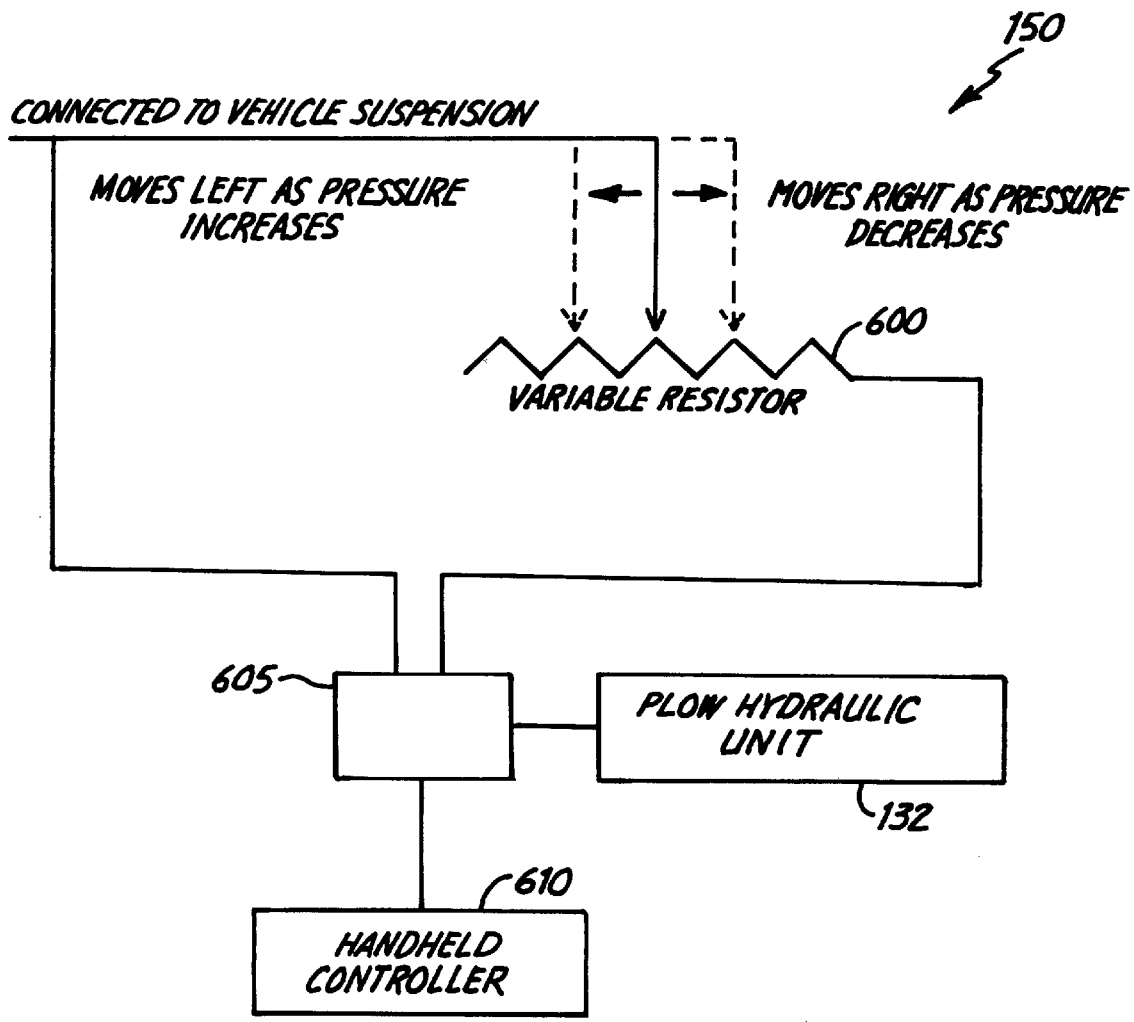
FIG. 5 is a diagrammatic view of another alternative embodiment of the control system of the present invention.

FIGS. 4A through 4F depict mechanical embodiments of the control system 150. Alternatively, as shown in FIG. 5, the control system 150 may make the transition from mechanical to electronic by using a device such as a variable resistor 600. The variable resistor 600 is constructed and arranged such that the amount of resistive material current passing through the resistor encounters is proportionate to the distance measured by the sensor 140. Thus, when the load felt by vehicle frame 160 increases or decreases relative to the predetermined load, the current flowing through variable resistor 600 changes, thereby providing a current to the microprocessor 605, preferably via an analog to digital converter (not shown) that has fluctuations representative of the changes in the load felt by vehicle frame 160. One skilled in the art will realize that when purely electronic sensors 140 are used, such as those shown in FIGS. 1 and 2, the output of these sensors 140 will be able to be fed directly into the computer 605, either via hardwire or via a transmitter/receiver configuration.

The present invention may operate in multiple modes, and the control system 150 operates uniquely in each. One such mode of operation is a "down pressure" mode, or feedback mode as described above. In this mode, there is a predetermined set load that indicates the desired amount of pressure on the vehicle frame 160 and may be selected by the vehicle operator. As the actual load is monitored, control system 150 makes corrections to the elevation of the plow blade 120 such that the predetermined set load on the vehicle frame 160 is maintained during operation.

Another mode of operation is the "float" mode. This mode allows snow plow blade 120 to "float" over the surface being plowed. While operating in the float mode in the preferred embodiment, the valves in the oil distribution box (not shown) which port fluid to either side of the hydraulic cylinder 132 are left open, thereby allowing the cylinder to move freely, so that the weight of plow blade 120 alone may be used to provide downward pressure. As the snow plow system 100 operates in float mode and plow blade 120 encounters contours in the road surface, the hydraulic fluid is allowed to flow between opposite sides of the hydraulic cylinder 132, thereby allowing the plow blade 120 to raise or lower as necessary. In this mode of operation, control system 150 may function to protect from an overload, but will not react to minor fluctuations in the load felt by vehicle frame 160. If plow blade 120 encounters an extreme contour, sensor 140 detects an abrupt change in the load on vehicle frame 160, and control system 150 activates the hydraulic pump and closes the ports to the cylinder 132 as necessary to raise or lower plow blade 120 and counteract the extreme contour.

Yet another such mode of operation is the manual mode. The manual mode is desirable when multiple levels of ice have built up and exist on a relatively flat surface. In this scenario, manual operation mode allows the plow blade 120 to scrape the ice off the surface, regardless of load. The vehicle operator directs control system 150 to raise plow blade 120 and then stop at the desired height. The manual mode further allows the snow plow system 100 to maintain a gap between the bottom of plow blade 120 and ground 240, which facilitates functions in addition to plowing snow such as spreading a layer of gravel or other granular material.

Each of these three modes, the down pressure mode, the float mode, and the manual mode, can be selected by the vehicle user. To accomplish this selection, control system 150 preferably includes a controller 610, shown diagrammatically in FIG. 5, and depicted in various embodiments in FIGS. 7–10. The controller 610 may be fixedly positioned within the vehicle cab such that it is operable by the vehicle operator. Alternatively, the controller 610 may be embodied as a handheld remote, either tethered or wireless, useable within the vehicle cabin.

Figure 6A:
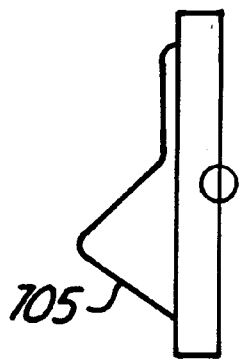
FIGS. 6A–D are diagrammatic side views of a control switch of the present invention in various positions corresponding to different modes of operation.
Figure 6B:
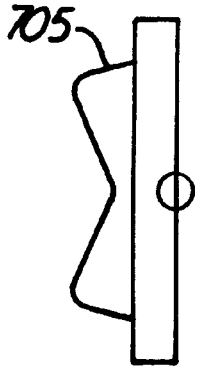
Figure 6C:
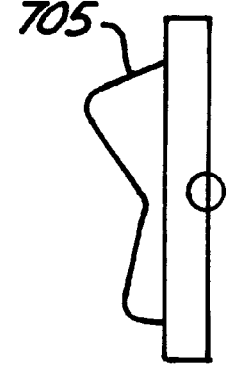
Figure 6D:
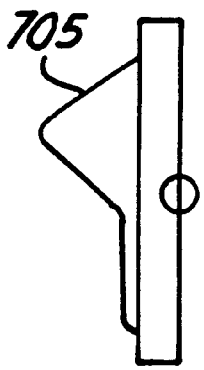

Each of the various controller embodiments includes a switch 705 used to toggle the snow plow system 100 between the different modes of operation. A preferred embodiment of this switch 705 is shown in FIGS. 6A–6D, in each of the various positions of the switch 705. Though the switch 705 could be wired in a variety of ways, a preferred embodiment has the up position, shown in FIG. 6A, corresponding to a "plow up" mode, whereby the plow 120 is held up when not in use. This switch position is preferably spring-loaded such that, when released, the switch returns to an "off" position. The next position, shown in FIG. 6B, is the off position. The off position holds the plow 120 in its present position. Thus, if it is desired to raise the plow 120, the switch 705 is moved to the plow up position of FIG. 6A until a desired height is achieved and then released. The switch 705 then automatically returns to the off position of FIG. 6B and holds the plow 120 at the desired height. The next position, shown in FIG. 6C, corresponds to the float mode. The switch 705 is constructed and arranged to remain in this position when selected. The float mode energizes the control system 150 such that the feedback system is in operation. The final position, shown in FIG. 6D, is a momentary "down" position similar to that of the up position shown in FIG. 6A. The down position increases the downward pressure placed on the plow by adjusting the feedback loop accordingly. More specifically, the microprocessor 605 is given a different target pressure. When the switch 705 is released, it returns to the float mode position of FIG. 6C. However, the plow 120 is now "floating" with an exerted downward pressure. Thus, the plow system 100 is in a down-pressure mode.

The hydraulics configurations that correspond to the various positions of switch 705, are herein explained. In the off position, oil is prevented from entering or leaving either side of the hydraulic cylinder 132. When the switch 705 is moved to the up position, oil is ported to an appropriate side of the cylinder 132 causing the plow blade 120 to raise. Once released, switch 705 returns to the off position and the oil is again prevented from entering or leaving either side of the cylinder 132.

Placing the control system 150 in float mode allows oil to flow freely to either side of the cylinder 132. This creates a situation whereby the plow 120 follows contours in the plowing surface. The downward pressure exerted by the plow is a result of the weight of the plow 120. The control system 150 uses data from the sensor 140 to ensure that any absolute limits set are not exceeded.

Placing the control system 150 in down pressure mode, by momentarily moving the switch 705 to the position shown in FIG. 6D, increases the perceived "weight" of the plow blade 120, by porting oil to the side of the cylinder 132 that results in a downward movement of the blade 120. Because the blade 120 meets the ground, pressure builds up in the cylinder to create the increased perceived weight. As this weight is perceived, the control system 150 enters into a very active state whereby the data received from the sensor 140 is constantly used to achieve the desired down pressure setting, embodied by a distance between the sensor 140 and the ground 240 or bracket 220. Subsequently pressing the switch 705 downward increases the down pressure of plow blade 120 by setting sensor 140 to a greater desired distance between vehicle frame 160 and axle 210. In this way, vehicle operator may set and alter the predetermined set load.

Figure 7:
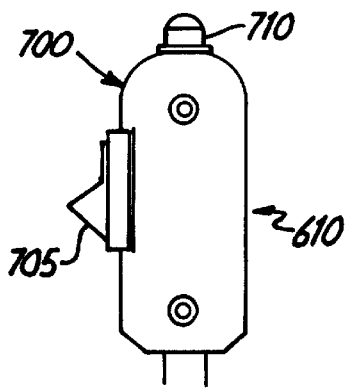
FIG. 7 is a side elevation of a joystick controller of the present invention.

FIGS. 7–10 show various embodiments of the controller 610. FIG. 7 shows a preferred embodiment whereby the controller 610 comprises a handheld joystick 700, operable within the cabin of the vehicle. The joystick 700 includes the mode switch 705 ergonomically positioned thereon. An LED 710 is operably placed on top of the joystick 700 and is preferably capable of emitting at least two colors, such as red and green, such that different meanings may be associated with each color. For example, the LED 710 may be operably connected to the microprocessor 605 such that the microprocessor may cause the LED to emit a green light when the control system 150 is operating in the float mode, and a red light when the control system 150 is operating in the down pressure mode.

Figure 8:
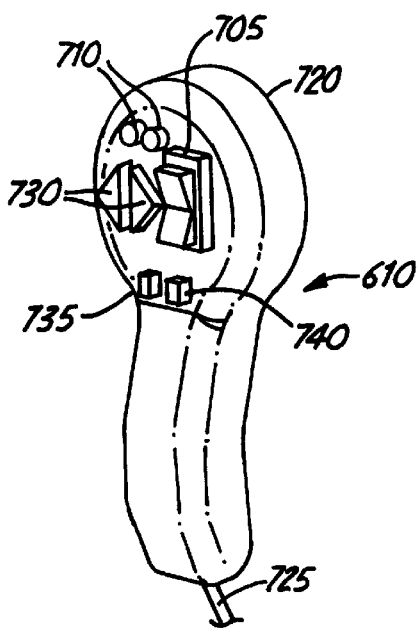
FIG. 8 perspective view of an alternative embodiment of a handheld controller of the present invention.

FIG. 8 shows a controller 610 in the form of a handheld remote 720, in tethered communication with the microprocessor 605 with a cord 725. Like joystick 700, remote 720 includes the mode switch 705 and at least one LED indicator 710. Additional buttons and indicators may also be provided such as plow angle control buttons 730, plow light control/indicator 735 and power button/indicator 740.

Figure 9:
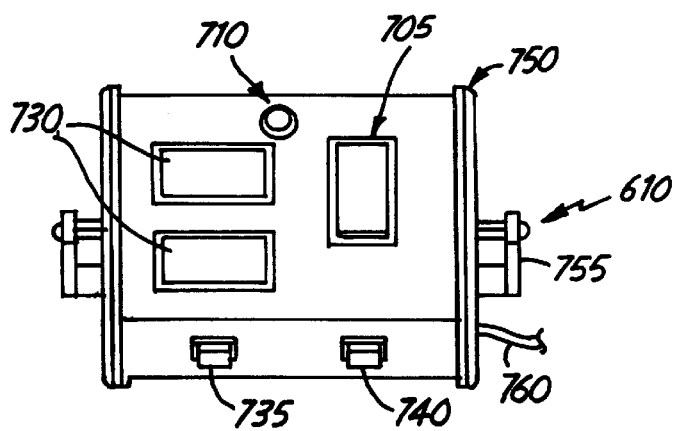
FIG. 9 is a perspective view of a control box of the present invention.

FIG. 9 shows yet another preferred embodiment of controller 610 in the form of a control box 750. The control box 750 is an advantageous embodiment of controller 610 in that it may be mounted overhead, and is relatively inexpensive to manufacture. The control box 750 is preferably pivotally mounted on a bracket 755 and communicates with the microprocessor 605 using a cord 760. The control box 750 may include the same controls and indicators, 705, 710, 730, 735, and 740 as handheld remote 720.

Figure 10:
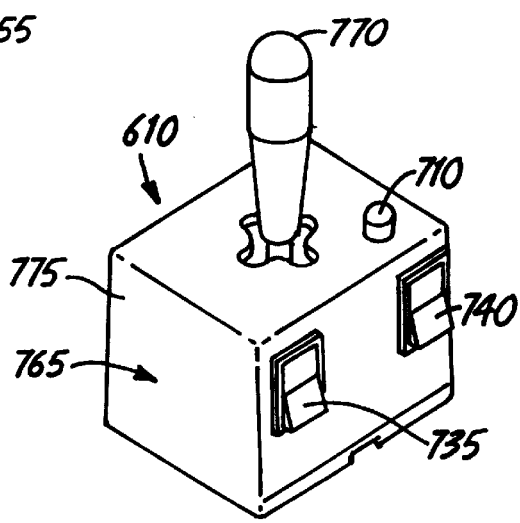
FIG. 10 is a perspective view of an alternative joystick controller of the present invention.

FIG. 10 shows still another preferred embodiment of controller 610 in the form of a joystick controller 765. In this embodiment, switch 705 is embodied as a stick 770 moveably attached to a base 775. The stick 770 is constructed and arranged so that it may be moved in one direction to instruct the microprocessor 605 to place the system 150 in "plow up" mode. Releasing the stick 770 places the system 150 in off mode, whereby the previous setting is maintained, as described above. Moving the stick 770 in an opposite direction, until a green LED indicator 710 is illuminated, places the system 150 in the float mode. Holding the stick 770 in this position for a predetermined time, indicated by the LED 710 shining a red light, places the system 150 in a down pressure mode. Preferably, the stick 770 may be moved side to side as well in order to control the angle of the plow blade 120. Switches 735 and 740 for lights and power, respectively, may be placed on the base 775.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A snow plow system, attachable to a vehicle having wheels and a suspended frame, comprising:
   a support arm pivotally attached to the vehicle;
   a plow blade pivotally attached to said support arm;
   a plow blade positioner, operable to pivot said support arm relative to the vehicle, thereby raising and lowering said plow blade;
   a sensor constructed and arranged to measure fluctuations in a load felt by the suspended frame; and,
   a control system, operably attached to said sensor and said positioner, which provides instructions to said positioner in response to data received from said sensor, such that said load is changed toward a predetermined set load.

2. The snow plow system of claim 1 wherein said predetermined set load is selected by an operator of the vehicle.

3. The snow plow system of claim 1 wherein said sensor is a proximity sensor.

4. The snow plow system of claim 3 wherein said proximity sensor is an electronic proximity sensor.

5. The snow plow system of claim 4 wherein said electronic proximity sensor comprises an ultrasonic transmitter and receiver.

6. The snow plow system of-claim 4 wherein said electronic proximity sensor comprises a laser emitter and receiver.

7. The snow plow system of claim 4 wherein said electronic proximity sensor comprises an infrared transmitter and receiver.

8. The snow plow system of claim 4 wherein said electronic proximity sensor comprises a SONAR transmitter and receiver.

9. The snow plow system of claim 4 wherein said electronic proximity sensor comprises a RADAR transmitter and receiver.

10. The snow plow system of claim 1 wherein said sensor measures said fluctuations in said load by measuring fluctuations in a distance between the suspended frame and a reference point fixed relative to at least one of the wheels.

11. The snow plow system of claim 10 wherein said reference point fixed relative to at least one of the wheels comprises the ground.

12. The snow plow system of claim 10 wherein said reference point fixed relative to at least one of the wheels comprises a bracket attached to an axle of the vehicle.

13. The snow plow system of claim 12 wherein said axle comprises a front axle.

14. The snow plow system of claim 12 wherein said axle comprises a rear axle.

15. The snow plow system of claim 1 wherein said sensor is a mechanical sensor.

16. The snow plow system of claim 15 wherein said mechanical sensor is fixedly attached to said suspended frame and said mechanical sensor comprises a telescoping linkage which contacts a target surface which remains substantially elevationally fixed relative to an axle of the vehicle.

17. The snow plow system of claim 16 wherein said target surface comprises a surface of a bracket fixedly attached to said axle.

18. The snow plow system of claim 16 wherein said axle comprises a front axle.

19. The snow plow system of claim 16 wherein said axle comprises a rear axle.

20. The snow plow system of claim 1 wherein said positioner comprises a pair of opposed pneumatic cylinders operably attached at one end to the vehicle and at an opposite end to said support arm.

21. The snow plow system of claim 1 wherein said positioner comprises a two-sided hydraulic cylinder operably attached at one end to the vehicle and at an opposite end to said support arm.

22. The snow plow system of claim 21 wherein said control system ports fluid to and from either side of said hydraulic cylinder in response to data received from said sensor, such that said load is changed toward said predetermined set load.

23. The snow plow system of claim 21 wherein said one end of the vehicle comprises the front of the vehicle.

24. The snow plow system of claim 21 wherein said one end of the vehicle comprises the rear of the vehicle.

25. The snow plow of claim 1 wherein said data comprises movement of a shaft which is proportional to the fluctuations of the load felt by the suspended frame, said shaft constructed and arranged to activate and deactivate micro switches in operable proximity with said shaft.

26. The snow plow of claim 1 wherein said data comprises electronic signals representative of a measurement of the fluctuations of the load felt by the suspended frame.

27. The snow plow of claim 1 wherein said instructions comprise electronic signals from micro switches created in response to movement of said switches by said sensor.

28. A feedback system for use with a snowplow attachment having a snowplow blade mounted on a light truck having a suspended frame and at least one axle, the system comprising:
  a sensor fixed relative to the truck frame and constructed and arranged to detect changes in a distance between the truck frame and a target surface which is fixed relative to one of the truck axles;
  a switch having at least two positions operably connected to said sensor such that a predetermined change in said distance between the truck frame and the target surface changes said position of said switch; and
  a controller usably attached to said snowplow blade to raise and lower said blade in response to an instruction from said switch.

29. The feedback system of claim 28 wherein said switch comprises a micro switch.

30. The feedback system of claim 28 further comprising a second switch having at least two positions operably connected to said sensor such that a second predetermined change in said distance between the truck frame and the target surface changes said position of said second switch.

31. The feedback system of claim 30 further comprising a third switch having at least two positions operably connected to said sensor such that a third predetermined change in said distance between the truck frame and the target surface changes said position of said third switch.

32. The feedback system of claim 31 further comprising a fourth switch having at least two positions operably connected to said sensor such that a fourth predetermined change in said distance between the truck frame and the target surface changes said position of said fourth switch.

33. The feedback system of claim 28 wherein said sensor comprises a mechanical linkage telescopically attached to said frame and mechanically connected with said switch.

34. The feedback system of claim 28 wherein said sensor comprises a proximity sensor electronically connected with said switch.

35. The feedback system of claim 34 wherein said sensor further comprises an infrared proximity sensor.

36. The feedback system of claim 34 wherein said sensor further comprises an ultrasonic proximity sensor.

37. The feedback system of claim 34 wherein said sensor further comprises a laser proximity sensor.

38. A method of controlling a vertical force placed on a vehicle by a snowplow blade attached thereto as the blade is moved over a plowing surface by the vehicle, said vehicle having wheels and a suspended frame, said method comprising:
  determining a desired impact operation of the snowplow blade on the suspended frame of the vehicle in terms of a desired vertical distance between the frame and a reference point which is fixed relative to at least one of the wheels;
  monitoring changes in an actual vertical distance between the frame and the reference point; and,
  in response to said changes in actual vertical distance, changing fluid pressure in a hydraulic cylinder operably attached to the vehicle and the blade, useable to pivot the blade vertically relative to the vehicle, until said actual vertical distance is within a predetermined range of said desired vertical distance.

39. The method of claim 38 wherein monitoring said changes in actual vertical distance between the frame and the reference point comprises communicating measurements of said actual vertical distance, taken by a proximity sensor fixed relative to the suspended frame, to a control system useable to port pressurized fluid to either side of said hydraulic cylinder.

40. A snowplow system, mountable to a light truck such as a pickup truck or a sport utility vehicle, the truck having a front axle and a rear axle and a frame suspended above the axles by a shock absorbing suspension system, the snowplow system comprising:
  a snowplow blade;
  a support arm having a first end and a second end, the first end pivotally attached to said blade, the second end pivotally attached to the frame of the light truck;
  a hydraulic cylinder housing comprising a piston slideably disposed within said cylinder, the cylinder operably attached at a first end to said support arm and operably attached at a second end to the frame;
  an oil distribution box constructed and arranged to selectively port oil to and from said hydraulic cylinder on either side of said piston;
  hydraulic fluid lines fluidly connecting said oil distribution box with said hydraulic cylinder;

a hydraulic fluid pump fluidly attached to said oil distribution box and able to supply pressurized hydraulic fluid thereto;

a feedback system operably attached to the frame having:
  a sensor fixed relative to the truck frame and constructed and arranged to detect changes in a distance between the truck frame and a target surface which is fixed relative to one of the truck axles; and,
  a switch having at least two positions operably connected to said sensor such that a predetermined change in said distance between the truck frame and the target surface changes said position of said switch; and, a control system including:
  a controller, disposed within an operator cabin of said vehicle, operably attached to said oil distribution box, and useable by an operator of the vehicle to raise said plow blade, lower said plow blade, and place said snowplow system in a predetermined mode of operation; and,
  an electrical data flow connection with said feedback system, said connection constructed and arranged such that data generated by said feedback system is receivable by said control system via said flow connection.

41. The snowplow system of claim 40 wherein the support arm second end is pivotally attached to the frame of the light truck by way of a mounting bracket operably attached to the frame of the light truck.

42. The snowplow system of claim 40 wherein the cylinder second end is operably attached to the frame of the light truck by way of a mounting bracket operably attached to the frame of the light truck.

43. The snowplow system of claim 40 further comprising a biasing spring attached at one end to a top portion of said blade and attached at an opposite end to said support arm, said biasing spring constructed and arranged to bias the top portion of the blade toward said support arm.

44. The snowplow system of claim 40 wherein said hydraulic cylinder first end comprises a push rod attached to said support arm and extending to a piston operably disposed within said hydraulic cylinder.

45. The snowplow system of claim 40 wherein said switch comprises a micro switch.

46. The snowplow system of claim 40 wherein said feedback system further has a second switch having at least two positions operably connected to said sensor such that a second predetermined change in said distance between the truck frame and the target surface changes said position of said second switch.

47. The snowplow system of claim 46 wherein said feedback system further has a third switch having at least two positions operably connected to said sensor such that a third predetermined change in said distance between the truck frame and the target surface changes said position of said third switch.

48. The snowplow system of claim 47 wherein said feedback system further has a fourth switch having at least two positions operably connected to said sensor such that a fourth predetermined change in said distance between the truck frame and the target surface changes said position of said fourth switch.

49. The feedback system of claim 40 wherein said sensor comprises a mechanical linkage telescopically attached to said frame and mechanically connected with said switch.

50. The feedback system of claim 40 wherein said sensor comprises a proximity sensor electronically connected with said switch.

51. The feedback system of claim 50 wherein said sensor further comprises an infrared proximity sensor.

52. The feedback system of claim 50 wherein said sensor further comprises an ultrasonic proximity sensor.

53. The feedback system of claim 50 wherein said sensor further comprises a laser proximity sensor.

* * * * *